US011509637B2

(12) United States Patent
Li et al.

(10) Patent No.: US 11,509,637 B2
(45) Date of Patent: Nov. 22, 2022

(54) DATA TRANSMISSION METHOD, SYSTEM AND PLATFORM USING BLOCKCHAIN, AND STORAGE MEDIUM

(71) Applicant: Silver Rocket Data Technology (Shanghai) Co., Ltd, Shanghai (CN)

(72) Inventors: Jia Li, Shanghai (CN); Yi Yuan, Shanghai (CN); Xiaoliang Pan, Shanghai (CN); Qing Yan, Shanghai (CN)

(73) Assignee: Silver Rocket Data Technology (Shanghai) Co., Ltd., Shanghai (CN)

( * ) Notice: Subject to any disclaimer, the term of this patent is extended or adjusted under 35 U.S.C. 154(b) by 404 days.

(21) Appl. No.: 16/746,868

(22) Filed: Jan. 18, 2020

(65) Prior Publication Data

US 2021/0176221 A1    Jun. 10, 2021

Related U.S. Application Data

(63) Continuation of application No. 16/708,151, filed on Dec. 9, 2019, now abandoned.

(30) Foreign Application Priority Data

Dec. 27, 2018   (CN) .......................... 201811611365.2
Dec. 27, 2018   (CN) .......................... 201811611370.3
(Continued)

(51) Int. Cl.
*H04L 29/06*     (2006.01)
*H04L 9/40*      (2022.01)
(Continued)

(52) U.S. Cl.
CPC ........ *H04L 63/0457* (2013.01); *G06Q 20/22* (2013.01); *H04L 9/0637* (2013.01);
(Continued)

(58) Field of Classification Search
None
See application file for complete search history.

(56) References Cited

U.S. PATENT DOCUMENTS 10,298,401 B1 *   5/2019  Goldberg ................ H04L 63/02
2002/0099663 A1 * 7/2002  Yoshino .............. H04L 63/0807
                                                        705/65

(Continued)

FOREIGN PATENT DOCUMENTS

CA           2467998 A1 *   2/2000  ............. G06F 21/10
WO      WO/2018/205137 A1   11/2018

*Primary Examiner* — William J. Goodchild
(74) *Attorney, Agent, or Firm* — Fideli Law PLLC

(57) ABSTRACT

A data transmission platform for data transmission using a blockchain is configured to receives ciphertext data from a data provider, wherein the ciphertext data include transmitted data authenticated by the data transmission platform and encrypted by the data provider; identifies a target data requestor; creates a smart contract according to a data transmission requirement of the target data requestor; uploads the smart contract to a blockchain; sends a data transmission request to the data provider; re-encrypts the ciphertext data to obtain re-encrypted data using a re-encryption key generated by the data provider; triggers the smart contract to send the data transmission demand of the data requestor to the data provider; and notifies the data requester to extract the decrypted data and perform decryption to obtain the transmitted data.

20 Claims, 11 Drawing Sheets

(30) Foreign Application Priority Data

Dec. 27, 2018 (CN) .......................... 201811611381.1
Dec. 27, 2018 (CN) .......................... 201811611382.6
Dec. 27, 2018 (CN) .......................... 201811613014.5

(51) Int. Cl.
*H04L 9/06* (2006.01)
*H04L 9/14* (2006.01)
*G06Q 20/22* (2012.01)
*H04L 9/32* (2006.01)
*H04L 9/00* (2022.01)

(52) U.S. Cl.
CPC .............. *H04L 9/14* (2013.01); *H04L 9/3247* (2013.01); *H04L 63/0442* (2013.01); *H04L 9/50* (2022.05)

(56) References Cited

U.S. PATENT DOCUMENTS

2014/0059352 A1* 2/2014 Haga ................. H04L 63/061
   713/171
2018/0285996 A1* 10/2018 Ma .................... H04L 9/3297

\* cited by examiner

DATA TRANSMISSION METHOD, SYSTEM AND PLATFORM USING BLOCKCHAIN, AND STORAGE MEDIUM

CLAIM OF PRIORITY

This application claims priority to U.S. Utility patent application Ser. No. 16/708,151, filed on Dec. 9, 2019, which claims priority to Chinese Application number 201811611382.6, filed on Dec. 27, 2018, Chinese Application number 201811611381.1, filed on Dec. 27, 2018, Application number 201811611370.3, filed on Dec. 27, 2018, Application number 201811611365.2, filed on Dec. 27, 2018, and Chinese Application number 201811613014.5, filed on Dec. 27, 2018, the contents of which are incorporated herein by reference.

TECHNICAL FIELD

The present application relates to computer technology, and more particularly, but not exclusively, to data transmission method and system, platform and storage medium.

BACKGROUND

With the development of the Internet, online transactions are prevalent, and Internet transactions have become the preferred method for more and more people. Internet data transmissions provide great convenience for people's lives, especially during data transactions.

At present, in the whole data transmission process, because the two parties cannot establish mutual trust, the transmitted data is transferred by a centralized trading platform, and usually only after the data transmission is completed does the centralized service platform transfer funds.

However, utilizing the centralized service platform for data transmissions makes it difficult to secure data transmissions and has low data transmission efficiency.

SUMMARY

The technical problem solved by the embodiment of the present disclosure is how to improve the efficiency and security of data transmission.

To solve the above-mentioned technical problem, some embodiments of the present disclosure provides a data transmission method and a data transmission platform.

According to an aspect of the present application, a data transmission method using blockchain includes: receiving, by the data transmission platform, ciphertext data from a data provider, wherein the ciphertext data include transmitted data authenticated by the data transmission platform and encrypted by the data provider; identifying, by the data transmission platform, a target data requestor; creating, by the data transmission platform, a smart contract according to a data transmission requirement of the target data requestor; uploading, by the data transmission platform, the smart contract to the blockchain; sending, by the data transmission platform, a data transmission request to the data provider; re-encrypting, by the data transmission platform, the ciphertext data to obtain re-encrypted data using a re-encryption key generated by the data provider; triggering, by the data transmission platform, the smart contract to send a data transmission service fee of the target data requestor to the data provider; and notifying, by the data transmission platform, the target data requester to extract the re-encrypted data and decrypt it to obtain the transmitted data.

According to some embodiments, the data transmission method further includes obtaining, by the data transmission platform, a signature of the transmitted data, wherein the signature of the transmitted data is generated based on a private key of a data collecting device that collects the transmitted data; and verifying, by the data transmission platform, the signature of the transmitted data via a public key of the data collecting device.

According to some embodiments, the identifying of the data requestor includes receiving the data transmission requirement of a data requestor; querying to obtain a data range that meets the data transmission requirement of the data requestor; sending the data range to the data requestor; and identifying the data requestor as the target data requestor of the data transmission when receiving a response acknowledgement to the data range from the data requestor.

According to some embodiments, the identifying of the target data requestor includes creating a data range and publishing it to the network; and identifying a data requestor as the target data requestor of the data transmission when receiving a response acknowledgement to the data range from the data requestor.

According to some embodiments, the smart contract includes the data transmission service fee and a data transmission deadline, and the data transmission method further comprising: when the data provider disagrees with the data transmission request, triggering the data transmission service fee in the smart contract to return to the data requestor after the data transmission deadline.

According to some embodiments, the data providers includes a plurality of data providers, and the smart contract includes the data transmission service fee, a data transmission deadline, and an amount of data corresponding to the transmitted data.

According to some embodiments, the smart contract includes a plurality of sub-contracts, each sub-contract corresponds to the target data requestor and one of the plurality of data providers.

According to some embodiments, the data transmission method further includes: after receiving the ciphertext data from the data provider, transmitting, by the data transmission platform, a corresponding reward fee to the data provider.

According to some embodiments, the data transmission method further includes: before re-encrypting the ciphertext data, verifying the re-encryption key by the data transmission platform.

According to some embodiments, the ciphertext data includes non-private plaintext data of the transmitted data, cyphered data of the transmitted data, and verification data associated with the cyphertext data.

According to another aspect of the present application, a data transmission platform for data transmission using a blockchain includes one or more storage medium including a set of instructions for data transmission using a blockchain; and one or more servers in communication with the at least one storage medium. When executing the set of instructions, the one or more servers: receive ciphertext data from a data provider, wherein the ciphertext data include transmitted data authenticated by the data transmission platform and encrypted by the data provider; identify a target data requestor; create a smart contract according to a data transmission requirement of the target data requestor; upload the smart contract to a blockchain; send a data transmission request to the data provider; re-encrypt the ciphertext data to obtain re-encrypted data using a re-encryption key generated by the data provider; trigger the smart contract to send the data transmission demand of the data requestor to the data provider; and notify the data requester to extract the decrypted data and perform decryption to obtain the transmitted data.

According to some embodiments, the one or more servers further: obtain a signature of the transmitted data, wherein the signature of the transmitted data is generated based on a private key of a data collecting device that collects the transmitted data; and verify the signature of the transmitted data via a public key of the data collecting device.

According to some embodiments, to identify the target data requestor, the one or more servers further: receive the data transmission requirement of a data requestor; query to obtain a data range that meets the data transmission requirement of the data requestor; send the data range to the data requestor; and identify the data requestor as the target data requestor of the data transmission when receiving a response acknowledgement to the data range from the data requestor.

According to some embodiments, to identify the target data requestor, the one or more servers further: create a data range and publishing it to the network; and identify a data requestor as the target data requestor of the data transmission when receiving a response acknowledgement to the data range from the data requestor.

According to some embodiments, the smart contract includes the data transmission service fee and a data transmission deadline, and the data transmission method further comprising: when the data provider disagrees with the data transmission request, triggering the data transmission service fee in the smart contract to return to the data requestor after the data transmission deadline.

According to some embodiments, the data providers includes a plurality of data providers, and the smart contract includes the data transmission service fee, a data transmission deadline, and an amount of data corresponding to the transmitted data.

According to some embodiments, the smart contract includes a plurality of sub-contracts, each sub-contract corresponds to the target data requestor and one of the plurality of data providers.

According to some embodiments, the at least one server further: send a corresponding reward fee to the data provider after receiving the ciphertext data of the data provider.

According to some embodiments, the at least one server further: verify the re-encryption key before re-encrypting the ciphertext data.

According to some embodiments, the ciphertext data includes non-private plaintext data of the transmitted data, cyphered data of the transmitted data, and verification data associated with the cyphertext data.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

DETAILED DESCRIPTION

Figure 1:
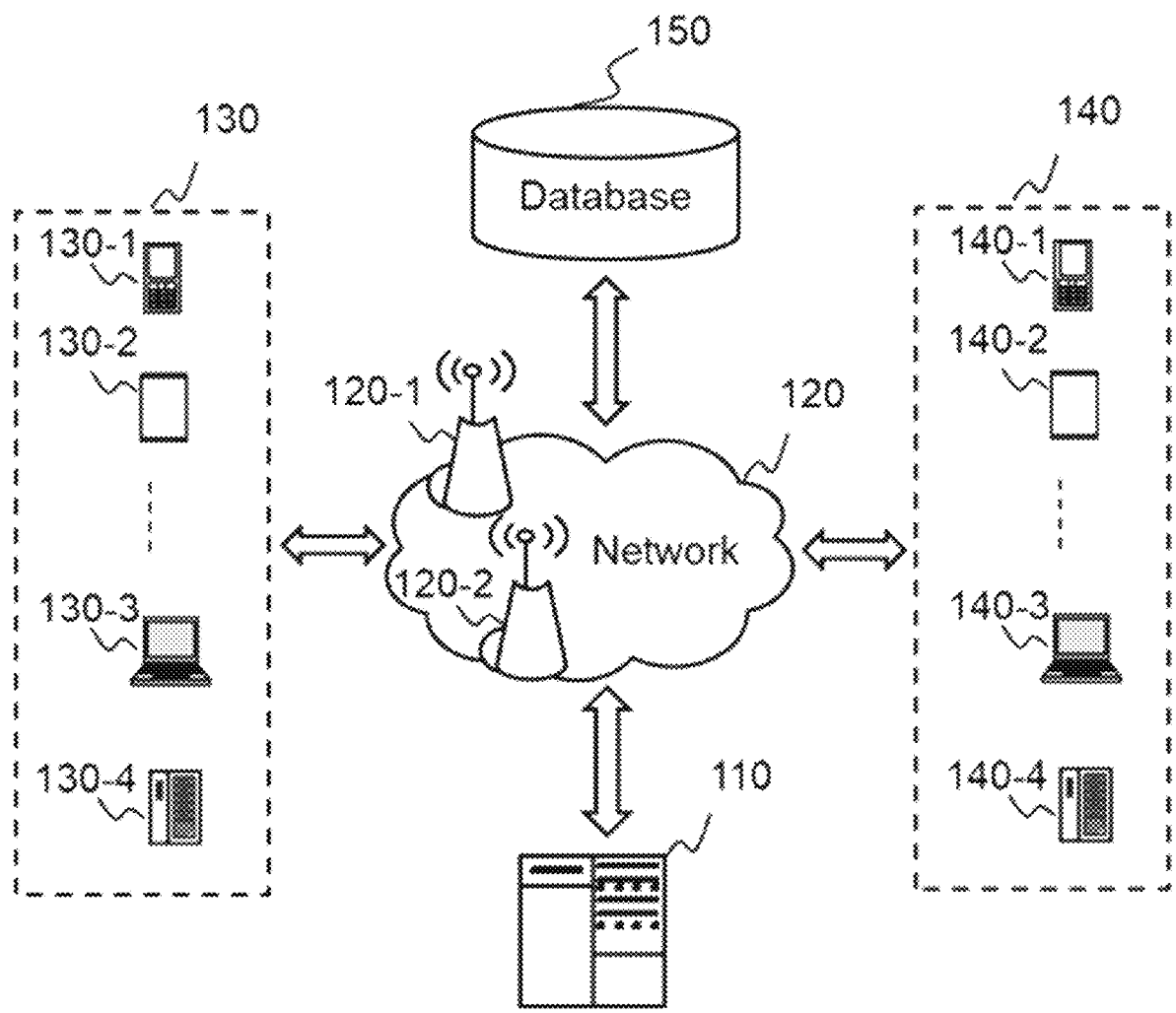
FIG. 1 is a block diagram of an exemplary on-demand service system 100 according to some embodiments.

Various aspects and examples of the disclosure will now be described. The following description provides specific details for a thorough understanding and enabling description of these examples. Those skilled in the art will understand, however, that the disclosure may be practiced without many of these details. Additionally, some well-known structures or functions may not be shown or described in detail, so as to avoid unnecessarily obscuring the relevant description.

The terminology used in the description presented below is intended to be interpreted in its broadest reasonable manner, even though it is being used in conjunction with a detailed description of certain specific examples of the disclosure. Certain terms may even be emphasized below, however, any terminology intended to be interpreted in any restricted manner will be overtly and specifically defined as such in this Detailed Description section.

As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

The flowcharts used in the present disclosure illustrate operations that systems implement according to some embodiments in the present disclosure. It is to be expressly understood, the operations of the flowchart may or may not be implemented in order. Conversely, the operations may be implemented in inverted order, or simultaneously. Moreover, one or more other operations may be added to the flowcharts. One or more operations may be removed from the flowcharts.

Data transaction is basically data transmission between 2 parties. As described above, existing data transmission methods usually use a centralized service platform for data transmissions, which has some shortcomings. For example, once a centralized service platform is attacked, transmitted data and data transmission security are compromised; and usually only after the data transmission is completed does the centralized service platform transfer funds, which is less efficient. Thus, the current data transmission methods need to be optimized.

In embodiments of the present disclosure, a smart contract running on the blockchain and authentication of the transmitted data before the data transmission are used to avoid the breach of contract or using of unsecured transmitted data for the data transmission, thereby ensuring the security of data transmission and increasing the efficiency of data transmission.

The above described purposes features and advantages of the present application will become more apparent from the detailed description of the embodiments.

FIG. 1 is a block diagram of an exemplary on-demand service system 100 according to some embodiments. For example, the on-demand service system 100 may be an online data transmission service platform for data transmission services. The on-demand service system 100 may be an online platform including a server 110, a network 120, a requestor terminal 130, a provider terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing engine 112 may be integrated in the requestor terminal 130 or the provider terminal 140.

The network 120 may facilitate exchange of information and/or data. In some embodiments, one or more components in the on-demand service system 100 (e.g., the server 110, the requestor terminal 130, the provider terminal 140, and the database 150) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or Internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a service request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a service request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the requestor terminal 130 and/or the provider terminal 140 may communicate with other positioning device to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the database 150 via the network 120. In some embodiments, the database 150 may be directly connected to or communicate with one or more components in the on-demand service system 100 (e.g., the server 110, the requestor terminal 130, the provider terminal 140, etc.). In some embodiments, the database 150 may be part of the server 110.

In some embodiments, one or more components in the on-demand service system 100 (e.g., the server 110, the requestor terminal 130, the provider terminal 140, etc.) may have a permission to access the database 150. In some embodiments, one or more components in the on-demand service system 100 may read and/or modify information relating to the requestor, provider, and/or the public when one or more conditions are met. For example, the server 110 may read and/or modify one or more users' information after a service. As another example, the provider terminal 140 may access information relating to the requestor when receiving a service request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile Internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be one or more software and/or applications used in the computer or mobile phone.

Figure 2:
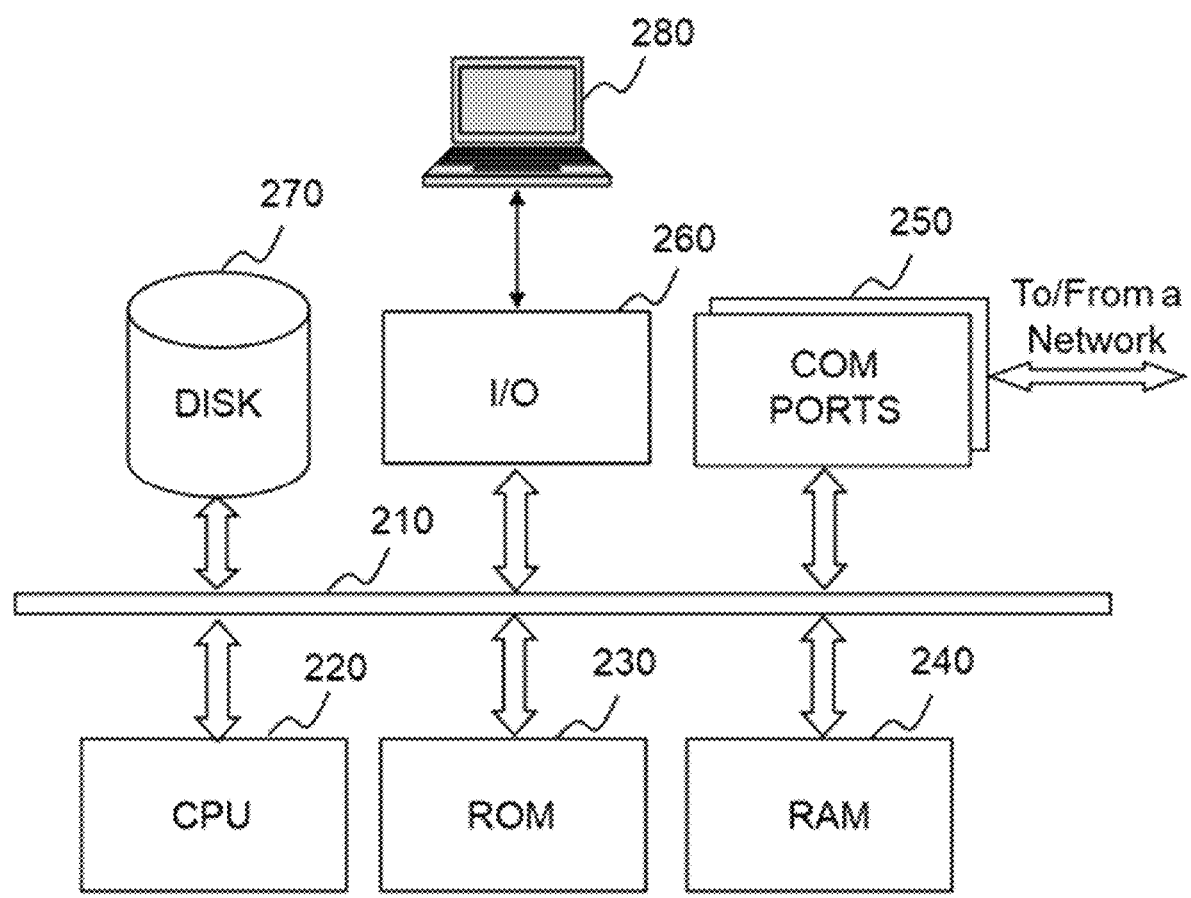
FIG. 2 is a block diagram illustrating an exemplary computing device in the on-demand service system according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general-purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random-access memory (RAM) 240, for various data files to be processed and/or transmitted by the computer. The exemplary computer platform may also include program instructions stored in the ROM 230, RAM 240, and/or other type of non-transitory storage medium to be executed by the CPU 220. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
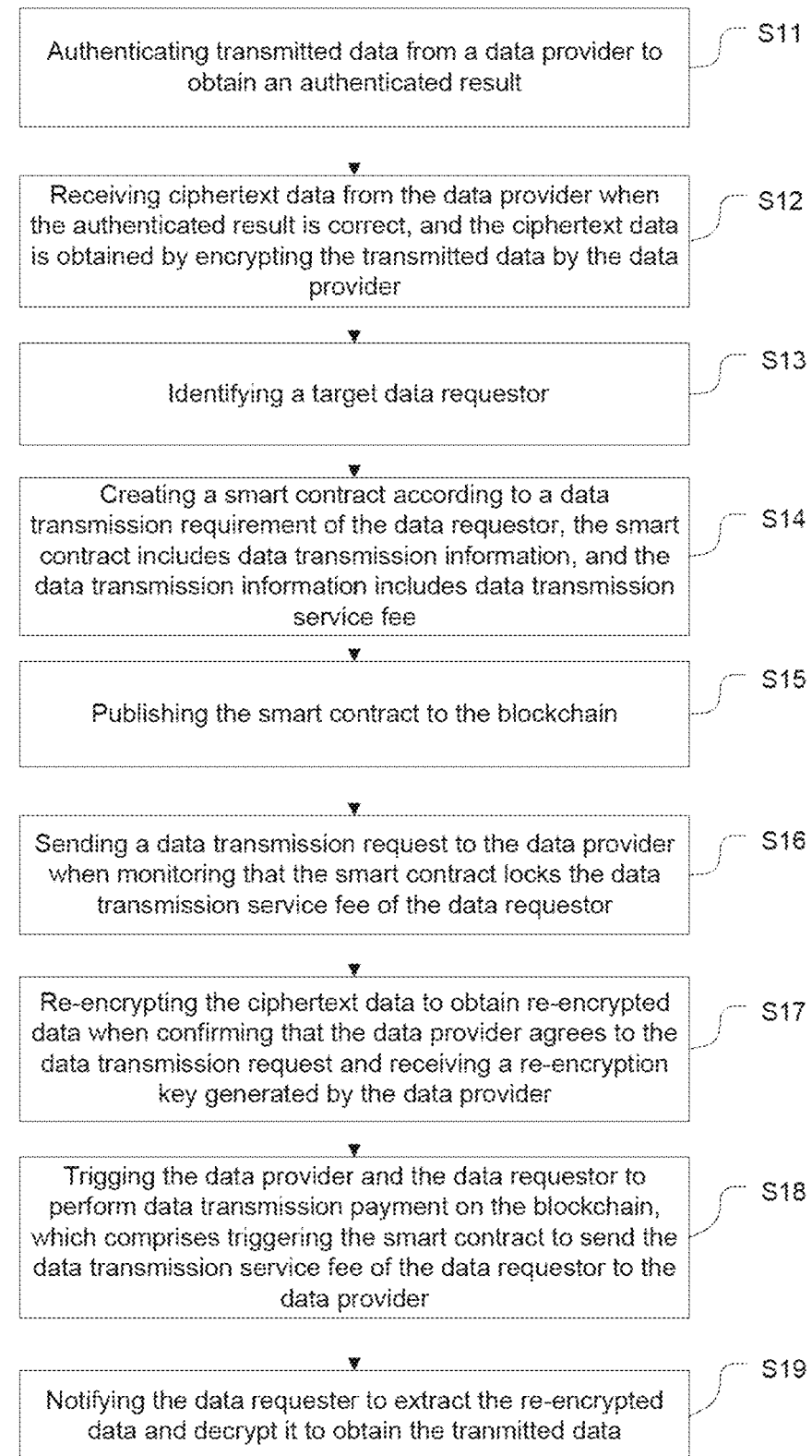
FIG. 3 is a flowchart of a data transmission method according to some embodiments of the present disclosure.

FIG. 3 is a flowchart of a data transmission method in some embodiments of the present disclosure. In the following embodiment of the present disclosure, a data transmission method is implemented by using a data transmission platform. It can be understood that other network nodes may also be implemented. As long as the data transmission According to some embodiments of the present disclosure can be implemented.

The following is a detailed description of the specific steps:

S11, authenticating transmitted data from a data provider to obtain an authenticated result.

According to some embodiments, S11 may be executed by the data transmission platform 100. For example, the data provider may be at least one of the provider 140 in the data transmission platform 100. The server 110 may authenticate the transmitted data from the data provider 140 to obtain the authenticated result.

The data provider's transmitted data may be authenticated in a variety of ways. In order to implement the authentication of the transmitted data, the transmitted data may be collected and encrypted by a authorized data collecting device, wherein the data collecting device includes an encryption chip with authorization authentication.

S12, receiving ciphertext data from the data provider when the authenticated result is correct, wherein the ciphertext data is obtained by encrypting the transmitted data by the data provider.

According to some embodiments, S12 may be executed by the data transmission platform 100. For example, the server 110 may receive the ciphertext data from the data provider 140 when the authenticated result is correct.

In order to prevent data from being stolen by a third party, the data provider 140 encrypts the transmitted data, obtains ciphertext data, and then sends the ciphertext data to the data transmission platform.

According to some embodiments, the data provider 140 encrypts the collected transmitted data by using its own public key to obtain the ciphertext data.

According to some embodiments, when receiving the ciphertext data of the data provider 140, a hash value of the transmitted data may be uploaded to the blockchain by the server 110 (or the data transmission platform 100).

According to some embodiments, the data provider 140 utilizes the preset one or more encryption algorithms to encrypt the transmitted data to obtain ciphertext data, and the encryption algorithm may be any preset asymmetric encryption algorithm such as an elliptic curve encryption algorithm or a digital signature algorithm.

According to some embodiments, the data transmission platform 100 stores the ciphertext data in the cloud storage (e.g., database 150).

According to some embodiments, after receiving the ciphertext data of the data provider 140, the data transmission platform 100 sends a corresponding incentive, such as a rewarding fee, to the data provider 140. By providing the reward fee to the data provider 140 that sent the ciphertext data, the data provider 140 is motivated to provide data to the data transmission platform again, so as to make use of the generated data to recreate the value and improve the utilization of the data.

For example, the data provider 140 may be a party that direct collect raw data and then send the raw, unprocessed data to the centralized server 110. Alternatively or additionally, to ensure the raw data will not be altered and/or tampered during later data transmissions, the data provider 140 may also process the raw data into a predetermined condition before sending the data to the centralized server 110. For example, the predetermined condition may be ciphertext data, i.e., the data provider 140 may convert and/or transform the raw data to the ciphertext data with a unified format, which may include cyphered data/texts of the raw data, plaintext description data (or metadata) of the raw data, as well as a verification data (e.g., a Hash value) of the raw data.

For example, the data provider 140 may conduct the following operations: 1. determine a Hash value of the raw data using a Hash function; 2. cypher/encrypt the raw data to cyphered data/texts. 3. distinguish, classify and/or determine non-private contents (or public contents) and private contents (or non-public content) from the raw data. 4. convert the raw data to the unified format to include plaintext description data (or metadata) of the raw data, the cyphered data/texts, as well as the Hash value as a verification data of the raw data. Data of the unified format may be called cyphertext data.

Here, the hash function may be any function that is used to map data of an arbitrary size (input) to a fixed size output. The resulting Hash value from the arbitrary input is not only fixed in length, but also completely unique to the input. A slightly change in the input may result huge difference in the output Hash value. The Hash function itself is deterministic and irreversible. That is, no matter how many times one runs the function on the same input, the output will always be the same. What is more, one cannot determine the input from the output. The plaintext description data may be the non-private contents of the raw data. The non-public or private content may be information substantial to the purpose of collecting the data, related to privacy of a particular party and/or of substantial commercial value. Non-private content may be information not substantial to the purpose of collecting the ciphertext data, not sensitive to the privacy of the third party, and/or not of particular commercial value. For example, the tire pressure data may be of substantial value to evaluate a specific vehicle model or may be of particular commercial value, or may be the main reason that the ciphertext data are collected. On the other hand, the timestamp may be classified as public information, because it is not substantial to the purpose of collecting the ciphertext data, not sensitive to the privacy of the third party, and/or not of particular commercial value.

After the data provider 140 sends the data to the centralized server 110 (or the data transmission platform 100), the centralized server 110 (or the data transmission platform 100) may convert the data to the ciphertext data if the data are raw data. Otherwise, the centralized server 24 may conduct data integration to the metadata of the ciphertext data.

The centralized server 110 (or the data transmission platform 100) may store the ciphertext data, or part of the ciphertext data in at least one database, such as the cloud storage (e.g., the database 150). In some embodiments, the at least one database may be centralized database. Indexing and searching of the ciphertext data stored in centralized database through their metadata (plaintext description data) may be much more efficient than indexing and searching the ciphertext data if they are stored in a distributed manner.

In some embodiments, the data provider 140 may collect the raw data periodically at a first period. To reduce the chance of alteration/tampering of the raw data, the raw data may be converted to the ciphertext data as soon as possible. Consequently, the basic size of the raw data being processed may be those collected within one first period. For example, the first period may be 10 minutes. One of ordinary skill in the art would understand that the first period may be any number of minutes and/or seconds. For example, the first period may be 1 minute, 2 minutes, 3 minutes, 4 minutes, 5 minutes, 6 minutes, 7 minutes, 8 minutes, 9 minutes, or any time period therebetween. Therefore, the first period may be the basic and finest granularity of the data sent to the centralized server 110 (or the data transmission platform 100) by the data provider 140, which may be called a data unit or unit ciphertext data.

The centralized server 110 (or the data transmission platform 100) receives the data unit from the data provider 140, and then may convert the data unit to unit-ciphertext-data. Further, the centralized server 110 (or the data transmission platform 100) may periodically collect the unit ciphertext data at a second period to form a group of units-ciphertext-data. Here, the second period may be greater than the first period. For example, the first period may be 10 minutes, and the second period may be 60 minutes, consequently, the group may include 6 units of ciphertext data.

Next, the centralized server 110 (or the data transmission platform 100) may collect the Hash value of each individual unit of ciphertext data in the group, and then determine a root Hash value of the individual Hash values in the group, called group Hash value. The centralized server 110 (or the data transmission platform 100) may then upload the group Hash value to the blockchain. Further, the centralized server 110 (or the data transmission platform 100) may also upload the Hash values of the individual data units in the group to the blockchain. For example, the centralized server 110 (or the data transmission platform 100) may store the group Hash value as a root node of a Merkle tree in the blockchain, and store the Hash values of the individual data units as leaf nodes.

Here, a Merkle tree may be a data structure tree where each non-leaf node is a Hash of its respective child nodes. When implemented in blockchains, Merkle trees may allow the blockchains to scale while also providing the hash-based architecture for them to maintain data integrity and a trivial way to verify the integrity of data.

Because the above Hash values may be stored in multiple blocks and/or nodes in the blockchain, the Hash values, or part of the ciphertext data, may be stored in a distributed manor.

As may be seen from the introduction above, the centralized server 110 (or the data transmission platform 100) may store the ciphertext data in dual-manner. For one thing, the centralized server 110 (or the data transmission platform 100) may store the metadata (plaintext description data) of the ciphertext data as well as the cyphered/encrypted data in the centralized way to facilitate search and access efficiency. On the other hand, the Hash values of the ciphertext data may be stored in the blockchain in a distributed way, thereby ensure the integrity of the ciphertext data. Any small change and/or alteration of the raw data may result in huge difference in the Hash values of the corresponding branch in the Merkle tree.

S13, identifying a target data requestor.

According to some embodiments, S13 may be executed by the data transmission platform 100. For example, the data requestor may be one or more of the service requestors 130 in FIG. 1, and the server 110 may identify the data requestor 130 in various ways.

In order to quickly identify the target data requestor 130, the target data requestor can independently submit the data transmission requirement to the data transmission platform 100, and the data transmission platform 100 queries a data range according to the data transmission requirement. Then the target data requestor 130 responds with acknowledgement. Alternatively, the data transmission platform 100 pre-creates the data range of the data provider 140, which is claimed/accepted by a data requestor 130 after then. A data requestor that acknowledges and/or accepts the data range from the data transmission platform 100 is called a target data requestor, because data transmission might occur between the data provider and the target data requestor.

According to some embodiments, the data range may be various types of real data records or attribute information of virtual data. For example, in the field of vehicle networking, the data range may be vehicle data such as vehicle models, driving segments, mileage, and time periods; in the field of medical health, the data range may be blood pressure, heart rate and blood concentration of the human body recorded by the medical device and the like; in the field of the Internet of Things such as smart home, the data range may be the temperature, wind speed, geographical location, boot time and other data of the air conditioner. According to some embodiments, there is no specific limitation on the type of the data range. It should be noted that the data range only contains non-private data.

According to some embodiments, the data transmission platform receives a public key provided by the target data requestor 130 when the target data requestor 130 is identified.

S14: creating a smart contract according to a data transmission requirement of the target data requestor, wherein the smart contract includes data transmission information, and the data transmission information includes data transmission service fee.

According to some embodiments, the data transmission platform 100 (e.g., the server 110) creates a smart contract according to the data transmission requirement of the target data requestor 130. The smart contract includes data transmission information, wherein the data transmission information includes the amount of transmitted data, a summary of the data exchange parties' identity information, data transmission service fee for the target data requestor 130 to perform the data transmission, a data usage specification to be observed by both parties, and punitive measures for breach of contracts, etc. Here, the smart contract is a computer protocol executable by a blockchain, which intendeds to digitally facilitate, verify, or enforce the negotiation or performance of a contract. Smart contracts allow the performance of credible transactions without third parties. These transactions are trackable and irreversible. Accordingly, after being uploaded to the blockchain and triggered, the smart contract may keep track on the communications and recordation between the data provider and the target data requestor. Therefore, the smart contract may provide the security of the data transmission after searching, improve search efficiency and protect the data transmission safety.

According to some embodiments, the smart contract executes the corresponding rules automatically according to the preset terms, and the execution process is accurate and timely, thereby improving the efficiency of data transmission.

S15: publishing the smart contract to the blockchain.

According to some embodiments, the data transmission platform 100 publishes/uploads the smart contract to the blockchain. For example, the server 110 uploads the smart contract to the block chain. The blockchain has the characteristics of decentralization and non-tampering. Therefore, once the smart contract is released/uploaded to the blockchain, the smart contract is hard to be tampered/altered with and the automatic execution of the smart contract is hard to be interfered, and both parties are able to check the execution of the smart contract in real time, thereby improving the security of data transmissions.

Once the smart contract is formed/published/uploaded to the blockchain, the smart contract may automatically direct the data transmission platform 100 (e.g., the server 110) to execute, or directly execute without involvement of the data transmission platform 100, contents of the smart contract, i.e., the data transmission platform 100 (e.g., the server 110) will passively execute the smart contract in the following steps or the smart contract will directly execute the data transmission and fee payment in the following steps.

S16: sending a data transmission request to the data provider 140 when monitoring that the smart contract locks the data transmission service fee of the target data requestor 130.

According to some embodiments, when the data transmission platform 100 (e.g., the server 110) executes the smart contract to monitor that the smart contract locks the data transmission service fee (e.g., the transmission service fee is defined/set in the smart contract) of the target data requestor 130, the data transmission platform 100, under the instruction of the smart contract, sends the data transmission request to the data provider 140 included in the smart contract. Since the target data requestor 130 provides data transmission service fee in the smart contract, the data transmission platform 100 thus determines that the target data requestor 130 agrees to the corresponding terms in the smart contract, then the data transmission platform 100 sends the data transmission request to the data provider 140 in the smart contract, thereby improving the efficiency of the data transmission.

According to some embodiments, the data transmission platform 100 polls the smart contract, wherein the polling interval may be 10 seconds, 20 seconds, or 30 seconds, etc. According to some embodiments, users may set time interval of the polling as needed, which is not specifically limited herein.

S17: re-encrypting the ciphertext data to obtain re-encrypted data when confirming that the data provider 140 agrees to the data transmission request and receiving a re-encryption key generated by the data provider 140.

According to some embodiments, the data transmission platform 100 (e.g., the server 110) executes the smart contract to verify the re-encryption key before re-encrypting the ciphertext data, thereby avoiding re-encryption using the wrong re-encryption key, thereby avoiding re-encryption key trading occurs in cases of malicious tampering, thereby avoiding data transmission fraud, reducing data transmission disputes, and further improving the security of data transmissions.

According to some embodiments, when the data transmission platform 100 receives the consent data transmission request of the data provider 140 and the re-encryption key generated by the data provider 140, the data encryption platform is uploaded to the data provider 140 by using the re-encryption key. The ciphertext data is re-encrypted to obtain re-encrypted data.

According to some embodiments, the data transmission platform 100 may also send the public key of the target data requestor 130 when sending the data transmission request to the data provider 140, wherein the data provider 140 may generate the re-encryption key by using its private key and the public key of the target data requestor 130.

According to some embodiments, the data transmission platform 100 stores the generated re-encrypted data in the cloud storage.

According to some embodiments, the data transmission information in the smart contract further includes a data transmission deadline. When the data provider 140 does not agree to the data transmission request, the smart contract is triggered automatically to return the data transmission service fee of the target data requestor 130 after the data transmission deadline. Even if the data provider 140 does not agree with the data transmission request, it does not hinder the execution of the entire data transmission, thus improving the efficiency of the data transmission; and automatically returning the data transmission service fee to the target data requestor 130 after the data transmission deadline simplifies the data transmission process and ensures the property security of the target data requestor 130.

In other aspects, the data transmission service fee of the target data requestor 130 may also be refunded when the data provider 140 refuses to sell the data.

S18: trigging the data provider 140 and the target data requestor 130 to perform data transmission payment on the blockchain, which includes triggering the smart contract to send the data transmission service fee from the target data requestor 130 to the data provider 140.

According to some embodiments, after generating the re-encrypted data, the data transmission platform 100 (e.g., the server 110) triggers the smart contract to update the status. According to a state machine in the smart contract, the smart contract automatically sends the data transmission service fee of the target data requestor 130 to the data provider 140 in the smart contract.

S19: notifying the data requester to extract the re-encrypted data and decrypt it to obtain the transmitted data.

According to some embodiments, the target data requestor 130 decrypts the re-encrypted data by using its own private key to obtain transmitted data after extracting the re-encrypted data from the data transmission platform 100.

With the above embodiment, the transmitted data is authenticated before the data transmission, and the data transmission between the data provider 140 and the target data requestor 130 is executed as a decentralized data transmission by automatically executing the data transmission process by the smart contract running on the blockchain. After obtaining the re-encrypting the data, the smart contract automatically triggers the data provider 140 and the target data requestor 130 to perform data transmission payment on the blockchain, and the data transmission service fee is transferred based on the smart contract, thereby avoiding data transmission fraud, breach of the data transmission, or the data transmission error caused by the network and thereby improving the security of data transmission and data transmission efficiency.

In order to enable a person skilled in the art to better understand and implement embodiments of the present disclosure, a transmitted data authentication method adopted by some embodiments of the present disclosure will be further described in detail through specific steps with reference to FIG. 2.

Figure 4:
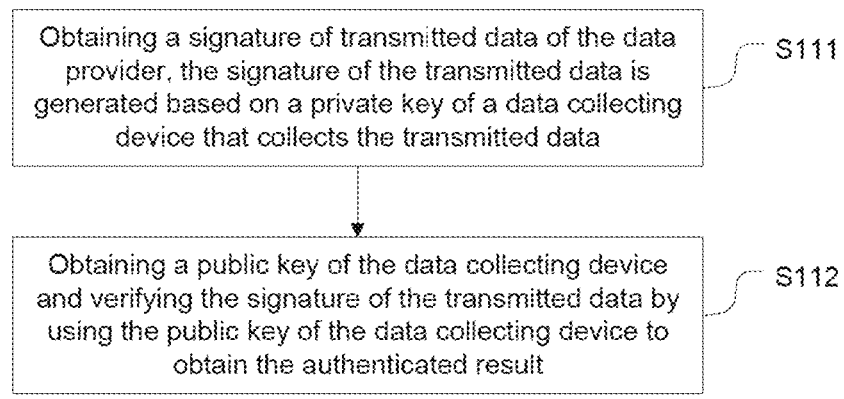
FIG. 4 is a flowchart of a transmitted data authentication method according to some embodiments of the present disclosure.

As shown in FIG. 4, in some embodiments of the present disclosure, the following steps are used to authenticate transmitted data:

S111: obtaining a signature of transmitted data of the data provider 140, the signature of the transmitted data is generated based on a private key of a data collecting device that collects the transmitted data.

According to some embodiments, the data collecting device generates a public-private key pair in advance. When the data collecting device collects the transmitted data, the data collecting device may generate a transmitted data signature for the collected transmitted data by using the private key generated by the data collecting device in advance.

S112: obtaining a public key of the data collecting device and verifying the signature of the transmitted data by using the public key of the data collecting device to obtain the authenticated result.

According to some embodiments, the data transmission platform 100 (the server 110) obtains the public key of the data collecting device in advance and uses the public key of the collector device to verify the signature of the obtained transmitted data. If the signature of the transmitted data is not generated by the private key of the data collecting device, a forged signature can be identified.

In some embodiments of the present disclosure, the data collecting device includes an encryption chip, and the public-private key pair of the data collecting device is generated by the encryption chip, and the signature of the transmitted data is generated based on the private key of the data collecting device, and the public key of the data collecting device is sent to the data transmission platform 100 in advance. The data transmission platform 100 uses the public key of the data collecting device to verify whether the received signature is from the data collecting device to identify a forged signature, thereby enhancing the security of the data.

It can be seen from above that the signature of the transmitted data is generated based on the private key of the data collecting device collecting the transmitted data and is authenticated by the public key of the data collecting device after the signature and the public key are obtained. Then, an authentication result is obtained by utilizing the public key of the data collecting device to authenticate the signature. If the signature of the transmitted data is not generated by the private key of the data collecting device, the forged signature is identified, thereby avoiding network fraud to occurs and improving the security of data transmission.

According to some embodiments, as described above, the target data requestor 130 can be identified in various ways, which will be described in detail as follows.

Figure 5:
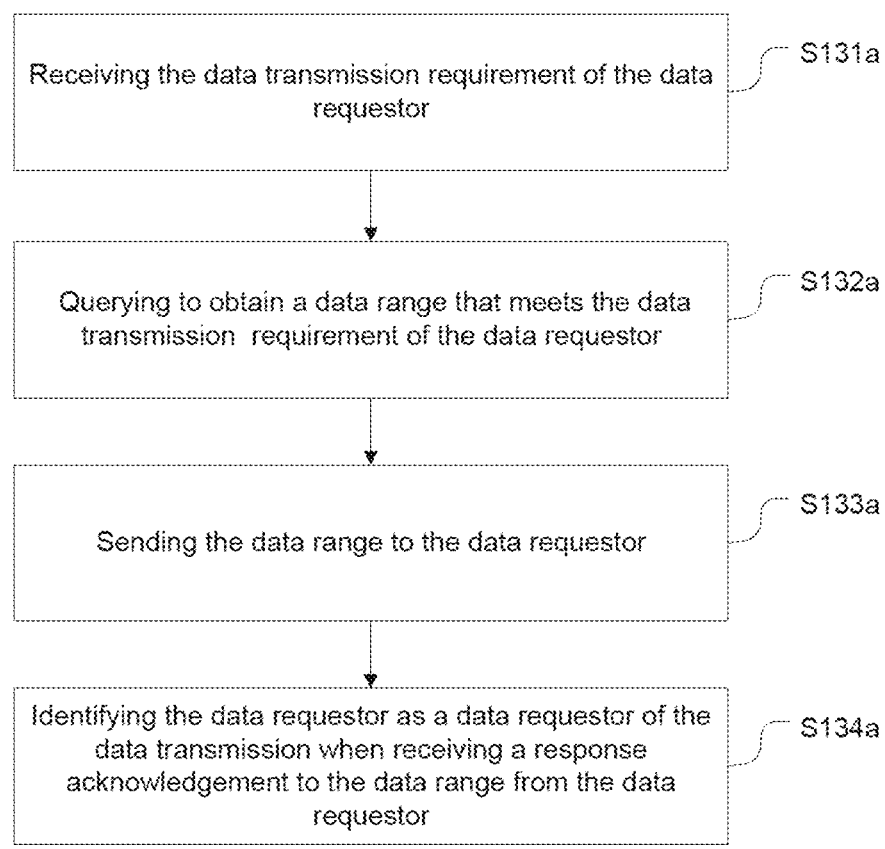
FIG. 5 is a flowchart of a method for identifying a data requestor according to some embodiments of the present disclosure.

As shown in FIG. 5, in some embodiments of the present disclosure, the following steps are used to identify the target data requestor 130:

S131a: receiving the data transmission requirement of a data requestor 130.

The data requestor 130 submits the data transmission requirement to the data to the data transmission platform 100, wherein the data transmission requirement is the requirement or condition of the data requestor 130 to purchase the data.

S132a, querying to obtain a data range that meets the data transmission requirement of the data requestor 130.

According to some embodiments, the data transmission platform 100 queries according to the data transmission requirement of the target data requestor 130 and obtain a data range that meets the data transmission requirement.

According to some embodiments, the data range may be various types of real data records or attribute information of virtual data. For example, in the field of vehicle networking, the data requirement may be vehicle data such as vehicle models, driving segments, mileage, and time periods; in the field of medical health, the data range may be blood pressure, heart rate and blood concentration of the human body recorded by the medical device and the like; in the field of the Internet of Things such as smart home, the data range may be the temperature, wind speed, geographical location, boot time and other data of the air conditioner. According to some embodiments, there is no specific limitation on the type of the data range. It should be noted that the data range only contains non-private data.

S133a: sending the data range to the target data requestor 130.

According to some embodiments, the data transmission platform 100 sends the queried data range to the data requestor 130.

S134a, identifying the data requestor 130 as a target data requestor 130 of the data transmission when receiving a response acknowledgement to the data range from the target data requestor 130.

According to some embodiments, the data requester 130 may acknowledge the data range sent by the data transmission platform 100, and when the data transmission platform 100 receives a response acknowledgement from the target data requestor 130 to the data range, it identifies the target data requestor 130 as a target data requestor 130 of the data transmission.

By adopting the above embodiment, the data range that meets the data transmission requirement of the target data requestor 130 is obtained by querying, and the response acknowledgement of the target data requestor 130 is also obtained, then the target data requestor 130 is quickly obtained, thereby improving the efficiency of the data transmission.

Figure 6:
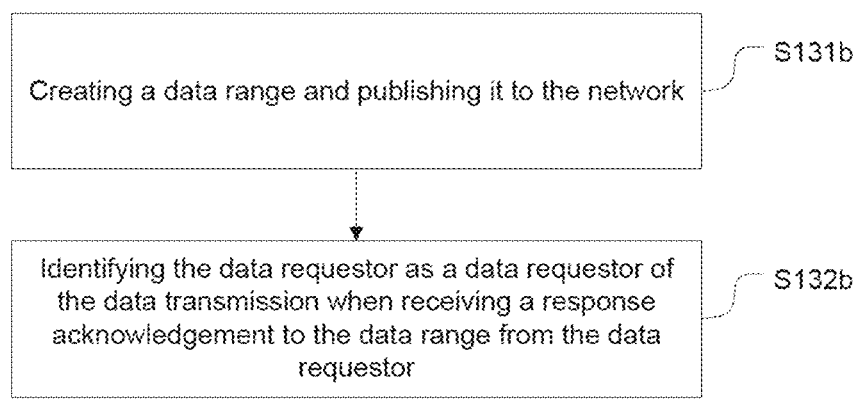
FIG. 6 is a flowchart of another method for identifying a data requestor according to some embodiments of the present disclosure.

As shown in FIG. 6, in another embodiment of the present disclosure, the following steps are used to identify the target data requestor 130:

S131b: creating a data range and publishing it to the network.

According to some embodiments, the data transmission platform 100 creates a data range according to the data provider's data and publish (e.g., upload) it to the network.

S132b: identifying a data requestor 130 as the target data requestor of the data transmission when receiving a response acknowledgement to the data range from the data requestor 130.

According to some embodiments, when the data range published on the network is queried by a target data requestor 130, and the data range meets the data requirement of the data requestor 130, the data requestor 130 may acknowledge the data range. When the data transmission platform 100 receives the response acknowledgement, the data requestor 130 is identified as the target data requestor 130 of the data transmission.

With the above embodiment, by creating a data range of the data provider 140 and publishing it to the network, the target data requestor 130 is identified when receiving a response acknowledgement of the data requestor 130 to the data range. The target data requestor 130 claims the data range autonomously, so that the target data requestor 130 can be obtained more quickly and widely, thereby improving the efficiency of data transmission.

In order to enable a person skilled in the art to better understand and implement the embodiments of the present disclosure, the following detailed description is made through specific application scenarios.

A large amount of data is generated with the use of various sensors. Taking the vehicle data as an example, during the running of the vehicle, various sensors on the vehicle will generate a large amount of data in real time, which may be tire pressure data, voltage data, fuel consumption data, etc., as well as road condition information and maintenance records recorded by the vehicle traveling data recorder, etc. Mining analysis of the generated large amount of data may create unexpected value, and there is currently a need to trade on a variety of data. However, the current data transmission process requires the parties to establish a trust relationship with each other or a third-party service platform as an intermediary to implement data transmissions. Both the security and efficiency of this data transmission process is very low.

Figure 7:
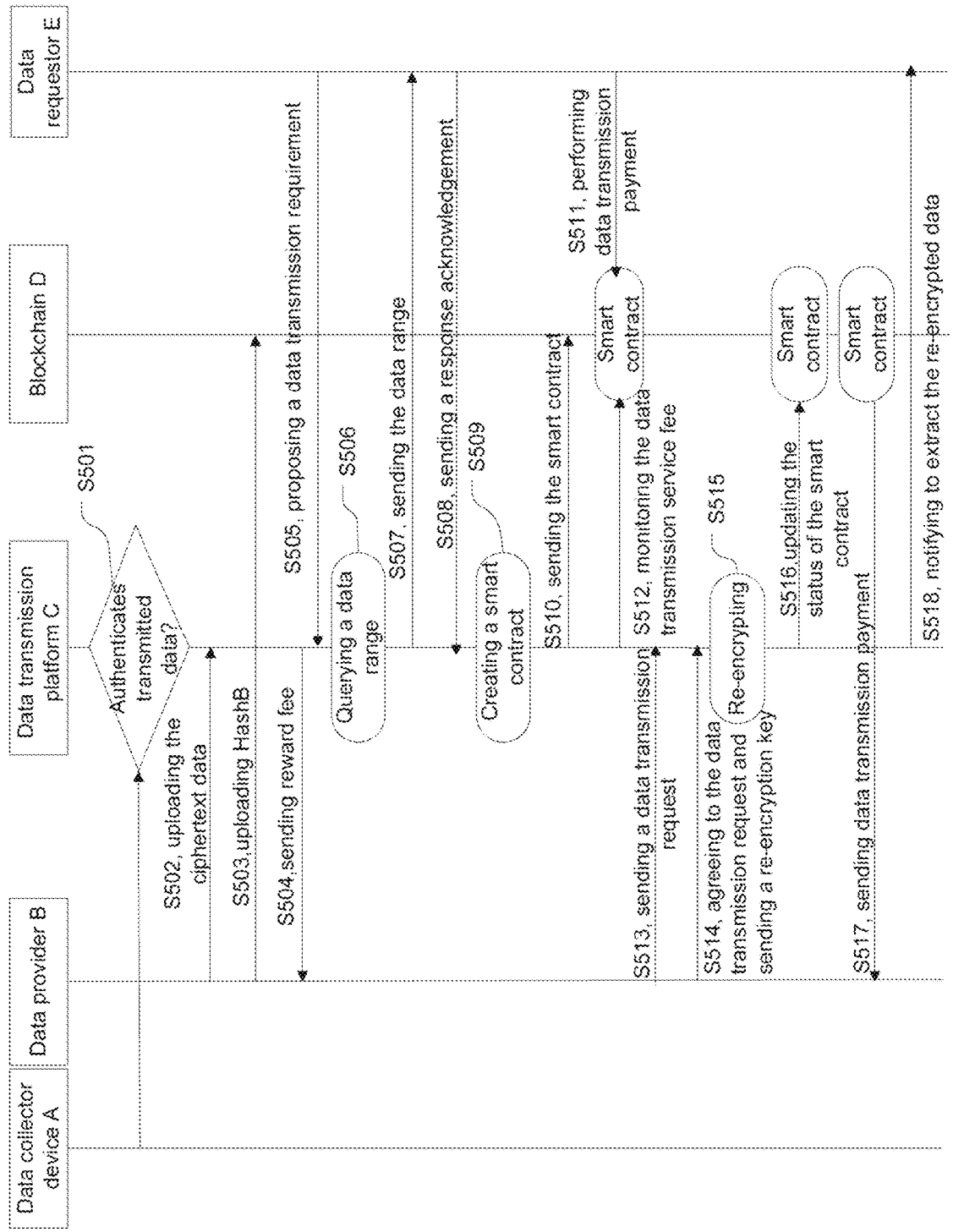
FIG. 7 is a flowchart of another data transmission method according to some embodiments of the present disclosure.

As shown in FIG. 7, the specific steps of implementing data transmission According to some embodiments of the present disclosure are described in detail as follows:

S501: the data transmission platform C authenticates the transmitted data.

According to some embodiments of the present disclosure, the data transmission platform C (e.g., the data transmission platform 100 or the server 110) obtains the signature of the transmitted data of the data provider B (e.g., the data provider 140), and then obtains the public key of the data collecting device A, if the signature of the transmitted data is generated based on the private key of the data collecting device A that collects the transmitted data, the transmitted data is authenticated.

S502: the data provider B uploads the ciphertext data to the data transmission platform C.

According to some embodiments of the present disclosure, the data provider B authorizes the data collecting device A to collect data, and the transmitted data collected by the data collecting device A is named PlainB.

According to some embodiments, the data collecting device A has a built-in encryption chip, and the encryption chip generates a public-private key pair of the data collecting device A including a public key PkB and a private key SkB (named based on the data provider B which authorizes the data collecting device A to collect data). The encryption chip encrypts the collected transmitted data PlainA by using the public key PkB to obtain the ciphertext data EncryptB.

S503: the data transmission platform C uploads the hash value HashB to the blockchain.

According to some embodiments of the present disclosure, the data provider B performs hash calculation on the transmitted data PlainB by using a preset algorithm, obtains a hash value HashB, and uploads it to the blockchain D.

By calculating the transmitted data PlainB, an irreversible hash value HashB corresponding to the transmitted data is generated. The data requestor E that obtains the hash value HashB cannot obtain the transmitted data PlainB through the hash value HashB. For example, the hash value HashB of the transmitted data PlainB represents the digest information and the signature of the transmitted data PlainB and the data provider B, and further represents that the transmitted data PlainB belongs to the data provider B, thereby realizing the confirmation of the transmitted data PlainB and guaranteeing the security of the data property.

According to some embodiments, the hash algorithm may be a conventional hash algorithm, such as SHA256 or SHA3. It should be noted that the hash algorithm described herein is merely an example, and in other embodiments, other hash operations may be used.

S504: the data transmission platform C sends reward fee to the data provider B.

According to some embodiments, after receiving the ciphertext data EncryptB of the data provider B, the data transmission platform C may send a corresponding reward fee to the data provider B.

S505: the data requestor E proposes a data transmission requirement to the data transmission platform C.

S506: the data transmission platform C queries a data range.

S507: the data transmission platform C sends the data range to the data requestor E.

S508: the data requestor E sends a response acknowledgement to the data transmission platform C, thereby identifying by the data transmission platform C as a target data requestor E.

According to some embodiments, the detailed description of the above embodiments may be referred to steps S505 to S508, and details are not described herein again.

S509: the data transmission platform C creates a smart contract.

According to some embodiments, the data transmission platform C creates the smart contract according to the data transmission requirements of the data requestor E, and the smart contract automatically execute the corresponding rule according to the preset terms.

According to some embodiments, when creating a smart contract, the smart contract may include data transmission information, and the data transmission information may include a data transmission deadline and a required data transmission service fee.

S510: the data transmission platform C sends the smart contract to the blockchain D.

According to some embodiments, the blockchain D may be Ethereum (ETH), a commercial distributed design blockchain operating system (EOS) or other public blockchains, consortium blockchains or private blockchains.

S511, the data requestor E performs data transmission payment in the smart contract.

According to some embodiments, the specific form of the data transmission payment may be Government Official Digital Currency.

S512: the data transmission platform C monitors the data transmission service fee in the smart contract.

According to some embodiments, the data transmission platform C polls the smart contract, so that the status indicated by the smart contract is monitored, or the smart contract sends the status update information to the data transmission platform C when there is data transmission service fee in the smart contract.

S513: the data transmission platform C sends a data transmission request to the data provider B.

According to some embodiments, the data transmission platform C sends the public key PkE of the data requestor E while sending the data transmission request to the data provider B.

The data requester E generates the public key PkE and the private key SkE by using the preset public-private key pair generator. According to some embodiments, the public-private key pair generator may be implemented by means of software, may be implemented in the form of a hardware offline tool, or may be implemented by a combination of software and hardware.

S514: the data provider B agrees to the data transmission request and sends a re-encryption key.

According to some embodiments, the data provider B generates a re-encryption key RekeyBE by using its own private key SkB and the received public key PkE of the data requestor E, and sends it to the data transmission platform C.

S515: the data transmission platform B performs re-encryption.

According to some embodiments, the data transmission platform B re-encrypts the ciphertext data EncryptB by using the received re-encryption key RekeyBE to obtain the re-encrypted data EncryptBE, and store it in the cloud storage of the data transmission platform B.

S516: updating the status of the smart contract.

According to some embodiments, after the data transmission platform B performs re-encryption, the smart contract in the blockchain D updates the status and automatically executes the preset instruction in the smart contract.

S517: the data transmission platform C sends a data transmission payment.

According to some embodiments, after the status of the smart contract in the blockchain D is updated, the smart contract automatically sends the data transmission service fee of the data requestor E to the data provider B.

S518: the data transmission platform C notifies the data requestor E to extract the re-encrypted data.

According to some embodiments, the data transmission platform C notifies the data requestor E to extract the re-encrypted data EncryptBE in the data transmission platform C cloud storage, and cause the data requestor E to decrypt the encrypted data EncryptBE by using its own private key SkE to obtain the transmitted data PlainB.

With the above embodiment, in the data transmission process, based on the smart contract under the blockchain and the authentication of the transmitted data before the data transmission, it is possible to avoid the breach of the data transmission and avoid the data transmission with unsafe transmitted data, thereby ensuring the security of data transmissions and improving the efficiency of data transmissions.

According to some embodiments, there may be a plurality of data providers, that is, the plurality of data providers may transact with the data requestor 130 through one smart contract. In the data transmission process, the smart contract contains a plurality of sub-contracts and each sub-contract corresponds to the data requestor 130 and one data provider 140. When one of the data providers disagrees with the data transmission request, based on the smart contract under the blockchain and the authentication of the transmitted data before the data transmission, it is possible to avoid the breach of the data transmission and avoid the data transmission with unsafe transmitted data, thereby ensuring the security of data transmissions and improving the efficiency of data transmissions.

To enable those skilled in the art to better understand and implement the embodiments of the present disclosure, the data transmission system will be described below with reference to FIG. 6.

Figure 8:
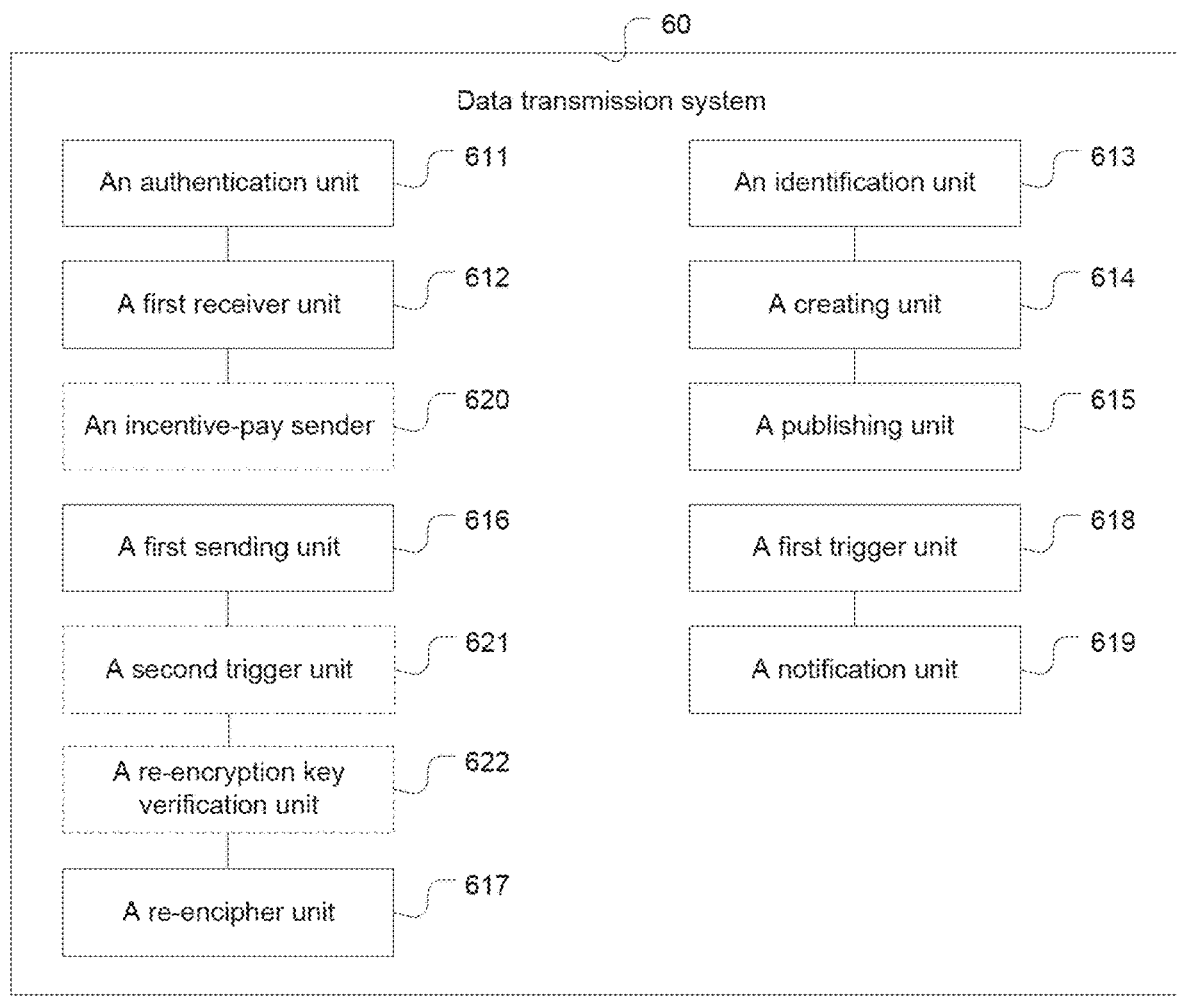
FIG. 8 is a schematic structural diagram of a data transmission system according to some embodiments of the present disclosure.

Referring to FIG. 8, some embodiments of the present disclosure provides a data transmission system 60, comprising:

an authentication unit 611 configured to authenticate transmitted data from the data provider 140 to obtain an authenticated result;

a first receiver unit 612 configured to receive ciphertext data from the data provider 140 when the authenticated result is correct, and the ciphertext data is obtained by encrypting the transmitted data by the data provider 140;

an identification unit 613 configured to identify the data requestor 130;

a creating unit 614 configured to create a smart contract according to a data transmission requirement of the data requestor 130, the smart contract includes data transmission information, and the data transmission information includes data transmission service fee;

a publishing unit 615 configured to publish the smart contract to a blockchain;

a first sending unit 616 configured to send a data transmission request to the data provider 140 when monitoring that the smart contract locks the data transmission service fee of the data requestor 130;

a re-encipher unit 617 configured to re-encrypt the ciphertext data to obtain re-encrypted data when confirming that the data provider 140 agrees to the data transmission request and receiving a re-encryption key generated by the data provider 140;

a first trigger unit 618 configured to trigger the data provider 140 and the data requestor 130 to perform data transmission payment on the blockchain, which comprises triggering the smart contract to send the data transmission demand of the data requestor 130 to the data provider 140; and a notification unit 619 is configured to notify the data requester to extract the decrypted data and perform decryption to obtain the transmitted data.

With the above data transmission system, since the two parties in the system automatically execute the data transmission process through the smart contract running on the blockchain, the decentralized data transmission is realized, and after the re-encrypted data is obtained, the data provider 140 and the data requestor 130 perform data transmission payment on the blockchain, and the transfer of the data transmission service fee is completed based on the smart contract, which avoids the occurrence of data transmission errors, thereby improving the security of the data transmission and the data transmission efficiency.

Figure 9:
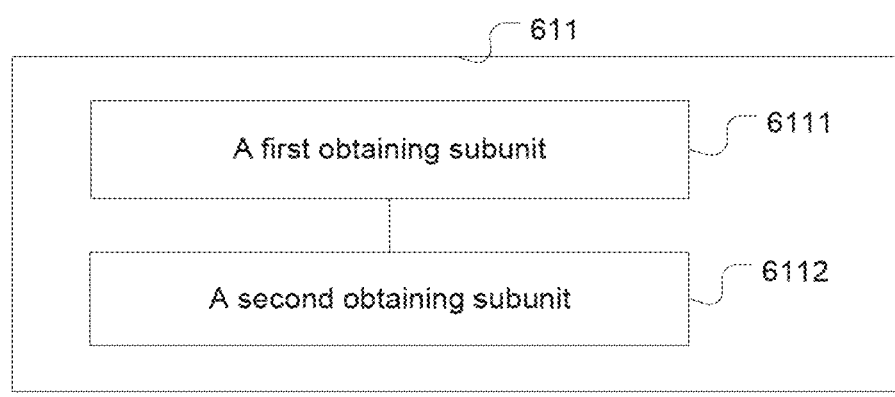
FIG. 9 is a schematic structural diagram of an authentication unit according to some embodiments of the present invention.

In some embodiments, as shown in FIG. 9, the authentication unit 611 includes:

a first obtaining subunit 6111 configured to obtain a signature of the transmitted data of the data provider 140, the signature is generated based on a private key of a data collecting device that collects the transmitted data; and a second obtaining subunit 6112 configured to obtain a public key of the data collecting device and verify the signature of the transmitted data by using the public key of the data collecting device to obtain the authenticated result.

Figure 10:
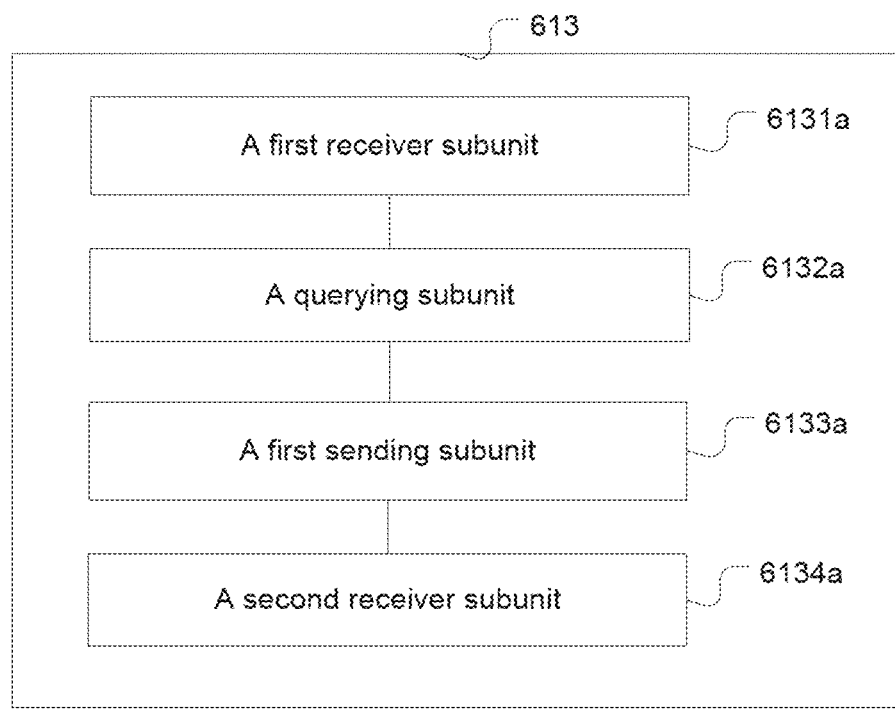
FIG. 10 is a schematic structural diagram of an identification unit according to some embodiments of the present disclosure.

In some embodiments, as shown in FIG. 10, the identification unit 613 includes:

a first receiver subunit 6131a configured to receive the data transmission requirement of the data requestor 130;

a querying subunit 6132*a* configured to query to obtain a data range that meets a data transmission requirement of the data requestor 130;

a first sending subunit 6133*a* configured to send the data range to the data requestor 130; and a second receiver subunit 6134*a* configured to identify the data requestor 130 as a data requestor 130 of the data transmission when receiving a response acknowledgement to the data range from the data requestor 130.

Figure 11:
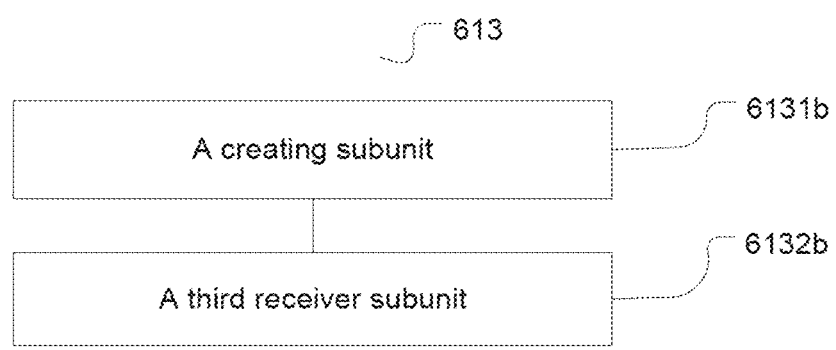
FIG. 11 is a schematic structural diagram of another identification unit in some embodiments of the present invention.

In another embodiment, as shown in FIG. 11, the identification unit 613 includes:

a creating subunit 6131*b* configured to create a data range and publish it to the network; and a third receiver subunit 6132*b* configured to identify the data requestor 130 as a data requestor 130 of the data transmission when receiving a response acknowledgement of the data requestor 130 to the data range.

With continued reference to FIG. 8, According to some embodiments, the data transmission system 60 further comprises: an incentive-pay sender 620 unit configured to send the corresponding reward fee to the data provider 140 after receiving the ciphertext data of the data provider 140.

According to some embodiments, the data transmission system 60 further comprises: a second trigger unit 621 configured to trigger the data transmission service fee in the smart contract to return to the data requestor 130 after the data transmission deadline when the data provider 140 disagrees with the data transmission request.

According to some embodiments, the data transmission system 60 further comprises: a re-encryption key verification unit 622 configured to verify the re-encryption key before re-encrypting the ciphertext data.

Some embodiments of the present disclosure further provide a data transmission platform comprising: a processor and a memory having computer instruction executable on the processor stored thereon, wherein the processor executes steps of any of the above-mentioned data transmission methods when the computer instruction is executed. Refer to the foregoing embodiments for details, which are not described herein.

Some embodiments of the present disclosure further provide computer readable storage medium having computer instruction stored thereon, wherein the computer instructions execute the steps of any of the above-mentioned data transmission methods. Refer to the foregoing embodiments for details, which are not described herein. The computer storage medium may include: a ROM, a RAM, a magnetic disk, or an optical disk, etc.

The explanation of the terms, the working principles, the specific implementations, and the beneficial effects of the data processing apparatus in some embodiments may refer to the data processing method in some embodiments, and details are not described herein again.

The embodiment further provides a computer readable storage medium, where computer instructions are stored, and the steps of the data processing method may be executed when the computer instruction being performed. For details, refer to the foregoing embodiments, and details are not described herein again.

The computer readable storage medium may be an optical disk, a mechanical hard disk, a solid-state hard disk, or the like.

The embodiment further provides a terminal, comprising a memory with computer instructions stored thereon and a processor, the computer instructions are executable on the processor, and when executed by the processor, perform the steps of the data processing method. Specific steps may refer to the abovementioned embodiments and details are not described herein again This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural components that do not differ from the literal language of the claims, or if they include equivalent structural components with insubstantial differences from the literal languages of the claims.

What is claimed is:

1. A data transmission method using blockchain, comprising:

receiving, by a data transmission platform, ciphertext data from a data provider, wherein the ciphertext data include transmitted data authenticated by the data transmission platform and encrypted by the data provider;

identifying, by the data transmission platform, a target data requestor;

creating, by the data transmission platform, a smart contract according to a data transmission requirement of the target data requestor;

uploading, by the data transmission platform, the smart contract to the blockchain;

sending, by the data transmission platform, a data transmission request to the data provider;

re-encrypting, by the data transmission platform, the ciphertext data to obtain re-encrypted data using a re-encryption key generated by the data provider;

triggering, by the data transmission platform, the smart contract to send a data transmission service fee of the target data requestor to the data provider; and notifying, by the data transmission platform, the target data requester to extract the re-encrypted data and decrypt the re-encrypted data to obtain the transmitted data.

2. The data transmission method of claim 1, further comprising:

obtaining, by the data transmission platform, a signature of the transmitted data, wherein the signature of the transmitted data is generated based on a private key of a data collecting device that collects the transmitted data; and verifying, by the data transmission platform, the signature of the transmitted data via a public key of the data collecting device.

3. The data transmission method of claim 1, wherein the identifying of the data requestor includes:

receiving the data transmission requirement of a data requestor;

querying to obtain a data range that meets the data transmission requirement of the data requestor;

sending the data range to the data requestor; and identifying the data requestor as the target data requestor of the data transmission when receiving a response acknowledgement to the data range from the data requestor.

4. The data transmission method of claim 1, wherein the identifying of the target data requestor comprises:

creating a data range and publishing the data range to a network; and identifying a data requestor as the target data requestor of the data transmission when receiving a response acknowledgement to the data range from the data requestor.

5. The data transmission method of claim 1, wherein the smart contract includes the data transmission service fee and a data transmission deadline, and the data transmission method further comprising: when the data provider disagrees with the data transmission request, triggering the data transmission service fee in the smart contract to return to the data requestor after the data transmission deadline.

6. The data transmission method of claim 1, wherein the data provider includes a plurality of data providers, and the smart contract includes the data transmission service fee, a data transmission deadline, and an amount of data corresponding to the transmitted data.

7. The data transmission method of claim 6, wherein the smart contract includes a plurality of sub-contracts, each sub-contract corresponds to the target data requestor and one of the plurality of data providers.

8. The data transmission method of claim 1, further comprising: after receiving the ciphertext data from the data provider, transmitting, by the data transmission platform, a corresponding reward fee to the data provider.

9. The data transmission method of claim 1, further comprising: before re-encrypting the ciphertext data, verifying the re-encryption key by the data transmission platform.

10. The data transmission method of claim 1, wherein the ciphertext data includes non-private plaintext data of the transmitted data, cyphered data of the transmitted data, and verification data associated with the cyphertext data.

11. A data transmission platform for data transmission using a blockchain, comprising:

one or more storage medium including a set of instructions for data transmission using a blockchain; and one or more servers in communication with the at least one storage medium, wherein when executing the set of instructions, the one or more servers:

receive ciphertext data from a data provider, wherein the ciphertext data include transmitted data authenticated by the data transmission platform and encrypted by the data provider;

identify a target data requestor;

create a smart contract according to a data transmission requirement of the target data requestor;

upload the smart contract to a blockchain;

send a data transmission request to the data provider;

re-encrypt the ciphertext data to obtain re-encrypted data using a re-encryption key generated by the data provider;

trigger the smart contract to send a data transmission demand of the target data requestor to the data provider; and notify the target data requester to extract the decrypted data and perform decryption to obtain the transmitted data.

12. The data transmission platform of claim 11, wherein the one or more servers further:

obtain a signature of the transmitted data, wherein the signature of the transmitted data is generated based on a private key of a data collecting device that collects the transmitted data; and verify the signature of the transmitted data via a public key of the data collecting device.

13. The data transmission platform of claim 11, wherein to identify the target data requestor, the one or more servers further:

receive the data transmission requirement of a data requestor;

query to obtain a data range that meets the data transmission requirement of the data requestor;

send the data range to the data requestor; and identify the data requestor as the target data requestor of the data transmission when receiving a response acknowledgement to the data range from the data requestor.

14. The data transmission platform of claim 11, wherein to identify the target data requestor, the one or more servers further:

create a data range and publishing the data range to a network; and identify a data requestor as the target data requestor of the data transmission when receiving a response acknowledgement to the data range from the data requestor.

15. The data transmission platform of claim 11, wherein the smart contract includes a data transmission service fee and a data transmission deadline, and when the data provider disagrees with the data transmission request, triggering the data transmission service fee in the smart contract to return to the data requestor after the data transmission deadline.

16. The data transmission platform of claim 11, wherein the data provider includes a plurality of data providers, and the smart contract includes a data transmission service fee, a data transmission deadline, and an amount of data corresponding to the transmitted data.

17. The data transmission platform of claim 16, wherein the smart contract includes a plurality of sub-contracts, each sub-contract corresponds to the target data requestor and one of the plurality of data providers.

18. The data transmission platform of claim 11, wherein the at least one server further:

send a corresponding reward fee to the data provider after receiving the ciphertext data of the data provider.

19. The data transmission platform of claim 11, wherein the at least one server further:

verify the re-encryption key before re-encrypting the ciphertext data.

20. The data transmission platform of claim 11, wherein the ciphertext data includes non-private plaintext data of the transmitted data, cyphered data of the transmitted data, and verification data associated with the cyphertext data.

* * * * *